UNITED STATES PATENT OFFICE.

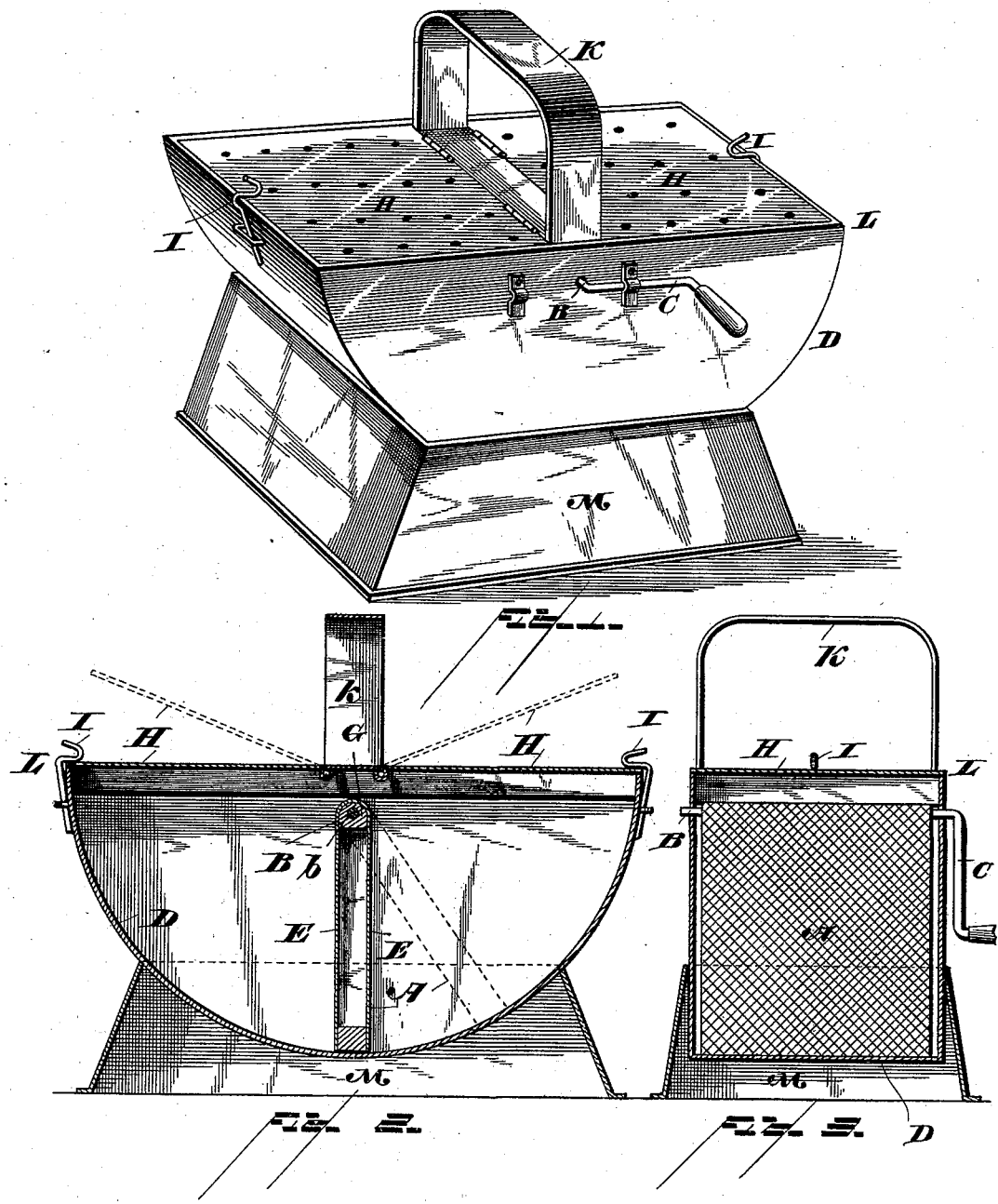

ROBERT SKIDMORE CRAIG, OF CINCINNATI, OHIO.

BAIT AND FISH BUCKET.

SPECIFICATION forming part of Letters Patent No. 372,124, dated October 25, 1887.

Application filed July 1, 1887. Serial No. 243,198. (No model.)

*To all whom it may concern:*

Be it known that I, ROBERT SKIDMORE CRAIG, a citizen of the United States of America, residing at Cincinnati, in the county of Hamilton and State of Ohio, have invented certain new and useful Improvements in a Bait and Fish Bucket, of which the following is a specification, reference being had therein to the accompanying drawings.

My invention relates to improvements in a bait and fish bucket, in which a crank with sieve attached is made to operate in conjunction within a half-circle-shaped receptacle; and the objects of my improvements are to provide a receptacle whereby live bait may be safely kept, and at the same time rendering it unnecessary to place the hands in the water to obtain bait when use of same is desired. I attain these objects by the mechanism illustrated in the accompanying drawings, in which—

Figure 1 is a perspective view. Fig. 2 is a longitudinal sectional view. Fig. 3 is a cross-sectional view.

The following letters refer to the various parts of my bucket. A is a sieve; B, a rod; C, a handle of crank. *b* shows where sieve is attached to B. D is half-circle forming the interior or bottom piece of the bucket. E are side pieces of the sieve. F is an end or lower side piece of the sieve. G is an end or top side piece of the sieve, which is fastened to rod B at *b*. H are perforated lids of the bucket. I are fastenings for lids of the bucket. K is the handle of the bucket. L is the rim of the bucket, and M is the base of the bucket.

In constructing my bucket or receptacle for bait or fish, tin or galvanized metal may be used, the interior or bottom being of one piece of metal formed in the shape of a half-circle, the exterior or side piece being of similar material to that of the half-circle-shaped bottom. Extending across and through the sides of the bucket, near its top, I place a rod, and to this rod is attached a crank. I also attach a square-shaped sieve to this rod B, with side pieces, E, F, and G, one of which pieces, F, is within close proximity of the surface of the half-circle-shaped bottom and sides of bucket, with a strip of metal extending over center of bucket, and to which perforated tops H are attached, with hand-piece K, secured to the sides of the bucket in a convenient manner for handling.

In using my bucket I place water within the same and place live bait—such as minnows or similar fish—within the bucket, and as bait may be desired to be used, turn the crank B either to the right or left, when sieve A, which is attached to crank B, acts as an elevator, raising the bait or minnows out of water and enabling the fisherman to handle the bait readily, rendering it unnecessary to place the hands in the water and agitating same, and heating to such a degree that minnows or similar bait are with difficulty kept in proper condition for use. On each side of crank are stays or check-pieces N, which keep the crank in proper position when turned from right to left. The perforated tops H of bucket are securely kept in position by fastenings I, and water may be readily removed from bucket by reversing the position so as to allow same to flow through perforated openings; or, if preferable, one of the tops may be opened, while, by a turn of the crank B, bait is kept securely in position while water is being removed.

I am aware that prior to my invention cylindrical bait and fish buckets have been used; but I do not claim such an invention; but What I do claim, and desire to secure by Letters Patent of the United States, is—

1. As an improved article of manufacture, a bait-basket having a semicircular body mounted on a base, perforated hinged covers, and a sieve journaled in the said body on a transverse shaft, having one end terminating in a crank-handle, substantially as and for the purpose described.

2. The combination, with a bait-basket, of a reciprocating sieve journaled on a transverse rod in the said basket and adapted to raise the bait in the basket out of the water therein, substantially as specified.

In testimony whereof I affix my signature in presences of two witnesses.

ROBERT SKIDMORE CRAIG.

Witnesses:
JOHN F. HANSON,
GEORGE W. JOYNER.